(12) United States Patent
Foster, Sr.

(10) Patent No.: US 6,612,934 B2
(45) Date of Patent: Sep. 2, 2003

(54) REACTION CONTROL DEVICE

(76) Inventor: Richard E. Foster, Sr., 13849 Reed Ave., Baton Rouge, LA (US) 70818-2936

( * ) Notice: Subject to any disclaimer, the term of this patent is extended or adjusted under 35 U.S.C. 154(b) by 54 days.

(21) Appl. No.: 09/862,758

(22) Filed: May 21, 2001

(65) Prior Publication Data

US 2001/0032746 A1 Oct. 25, 2001

Related U.S. Application Data

(63) Continuation-in-part of application No. 09/436,380, filed on Nov. 9, 1999, now Pat. No. 6,234,267.

(51) Int. Cl.$^7$ .................................................. B60K 8/00
(52) U.S. Cl. ........................................................ 464/185
(58) Field of Search ................................ 464/170, 185, 464/180; 248/607, 648, 649, 653; 310/51, 91

(56) References Cited

U.S. PATENT DOCUMENTS

| | | | | |
|---|---|---|---|---|
| 1,000,494 A | * | 8/1911 | Clement | 123/192.1 |
| 1,600,071 A | * | 9/1926 | Shaifer | 177/DIG. 9 |
| 1,638,782 A | * | 8/1927 | Paton | 123/192.1 |
| 2,211,108 A | * | 8/1940 | Gerald | 290/7 |
| 4,313,823 A | * | 2/1982 | Locker | 188/380 |
| 4,679,464 A | * | 7/1987 | Castellani | 188/303 |
| 4,759,262 A | * | 7/1988 | Hay, II | 248/49 |
| 4,852,848 A | * | 8/1989 | Kucera | 188/379 |
| 4,856,156 A | * | 8/1989 | Link et al. | 492/15 |
| 5,003,835 A | * | 4/1991 | Ackermann et al. | 188/317 |
| 5,373,923 A | * | 12/1994 | Koenig | 188/303 |
| 6,057,618 A | * | 5/2000 | Brunken, Jr. | 248/609 |

* cited by examiner

Primary Examiner—Lynne H. Browne
Assistant Examiner—Kenn Thompson

(57) ABSTRACT

As rotational mechanical devices accelerate or decelerate, they have an opposite reaction against their housing and/or their surroundings in fact to move the earth. This reaction represents wasted energy that is lost to the system. The invention comprises the use of equal and opposite force from an energy source gravity via activated spring, cable, or counterweight applied fresh as acceleration begins or lift and release from opposite or adjacent sides to reset. These methods can conserve as much as three-fourths of the applied energy for motors, machines, and other motion-related applications.

9 Claims, 5 Drawing Sheets

REACTION CONTROL DEVICE

CONTINUATION-IN-PART APPLICATION

This application is a continuation-in-part of U.S. patent application Ser. No. 09/436,380 filed Nov. 9, 1999, which issued as U.S. Pat. No. 6,234,267 on May 22, 2001 and which is hereby incorporated by referenced in its entirety.

BACKGROUND OF THE INVENTION

1. Field of the Invention

The invention relates to the conservation of energy in general and with conservation of energy in mechanical devices during acceleration and deceleration in particular.

2. Prior Art

Newton's third law of motion states that for every action there is an equal and opposite reaction. In prior art systems, the energy expended on the reaction is typically dissipated through the surroundings of the device and lost to the environment Earth. This energy is not used to perform the work of the device, and is thus wasted. A motor or other mover wastes half the applied energy when it accelerates while the load or machine or vehicle wastes half of that. Fortunately the load or machine with its opposite torque matches that of the motor at constant velocity only so that part of the energy is conserved as is. Accordingly, an invention meeting the following objectives is desired.

OBJECTS OF THE INVENTION

It is an object of the invention to retain a greater amount of the energy expended in operation of a mechanical device within the mechanical system.

It is another object of the invention to use gravity to block the reaction and counteract torque in rotational mechanical devices created by acceleration and deceleration thereby making it action/action.

It is still another object of the invention to increase the efficiency of rotational mechanical devices so that much smaller engines and fuel tanks will be needed.

It is still another object to conserve reactions in general to action/action.

SUMMARY OF THE INVENTION

As rotational mechanical devices accelerate or decelerate, they generate greater reactive force against their housing and/or their surroundings. This reactive torque represents wasted energy that is lost to the system since it moves the earth, a ready receptor albeit an infinitisimal amount from that standpoint, but even so consumes three-fourths of the applied energy needlessly.

The Invention comprises the use of equal and opposite force from an energy source i.e. gravity via such as a spring, or cable or counterweight to counteract to the reactive torque generating forces in the mechanical device.

To fully block the reaction, the counterweight spring, cable or other means must be applied fresh and properly at the very start/acceleration. However, if counterweight is in place in advance of start, it must be activated by lift a minute amount and release while reaching from the opposite side or an adjacent side. This is effective as long as acceleration occurs uninterrupted i.e. reset to activate This is analogous to weighing on a balance scale. Reaction wastes energy by moving the earth. Reaction is a strain or unsteady state which consumes energy needlessly.

BRIEF DESCRIPTION OF THE DRAWINGS

FIG. 1D illustrates a motor or machine having another embodiment of a brace applied properly and timely to counteract reaction forces exerted against the housing.

DETAILED DESCRIPTION OF THE INVENTION

Figure 1A:
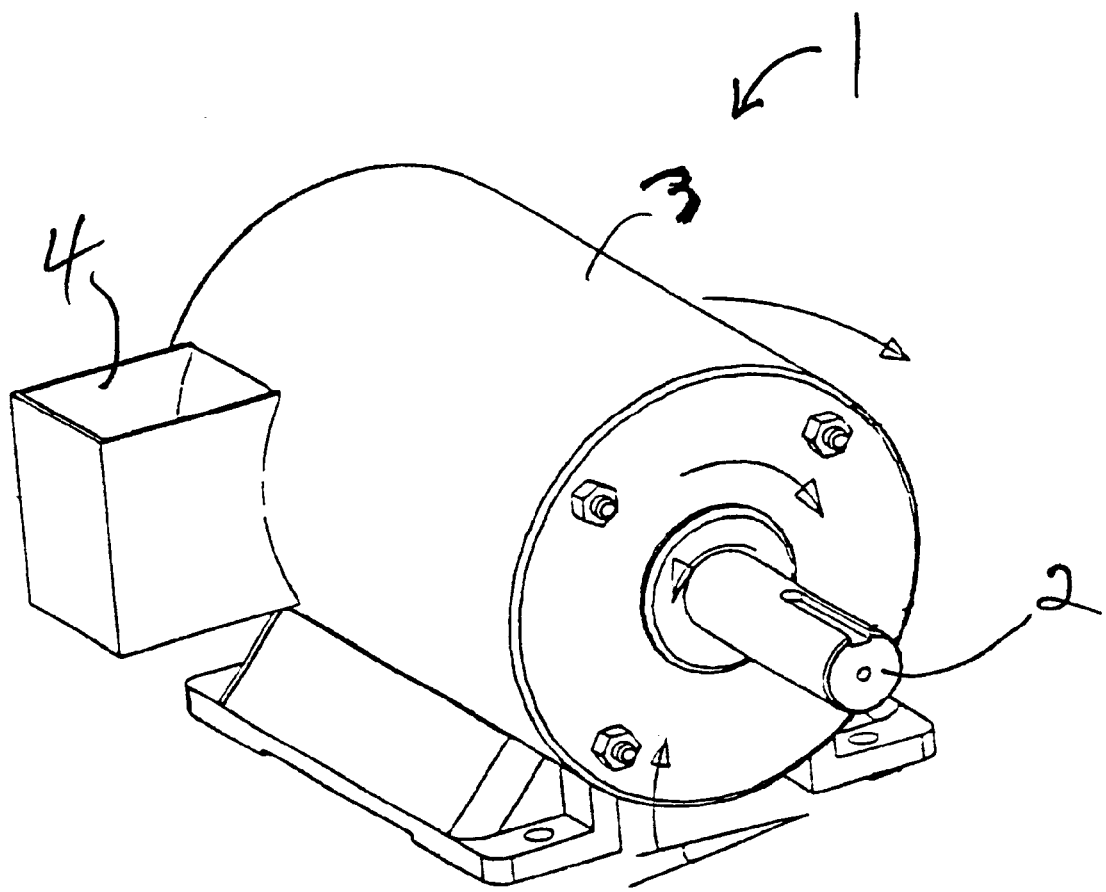
FIG. 1A illustrates a motor or a machine with a static counterweight on the light side of the housing and counterweight either applied just as start/accelerate or else reset to activate by lift and release reaching from opposite side.
Figure 1B:
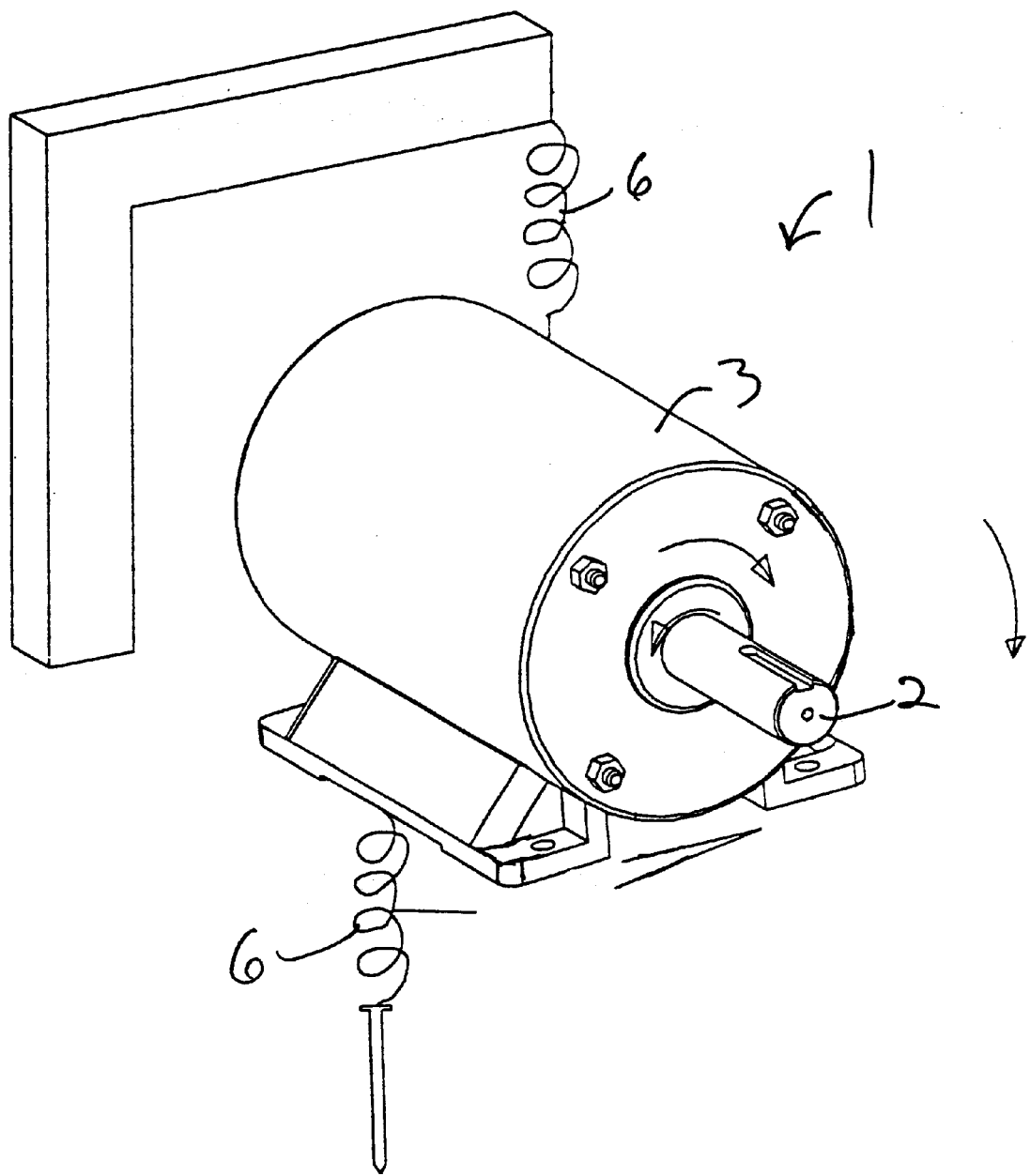
FIG. 1B illustrates a motor or a machine with spring tension applied downward to the light side of the housing or with spring tension applied properly and timely as in FIG. 1A above in the opposite direction to the heavy side of the housing.
Figure 1C:
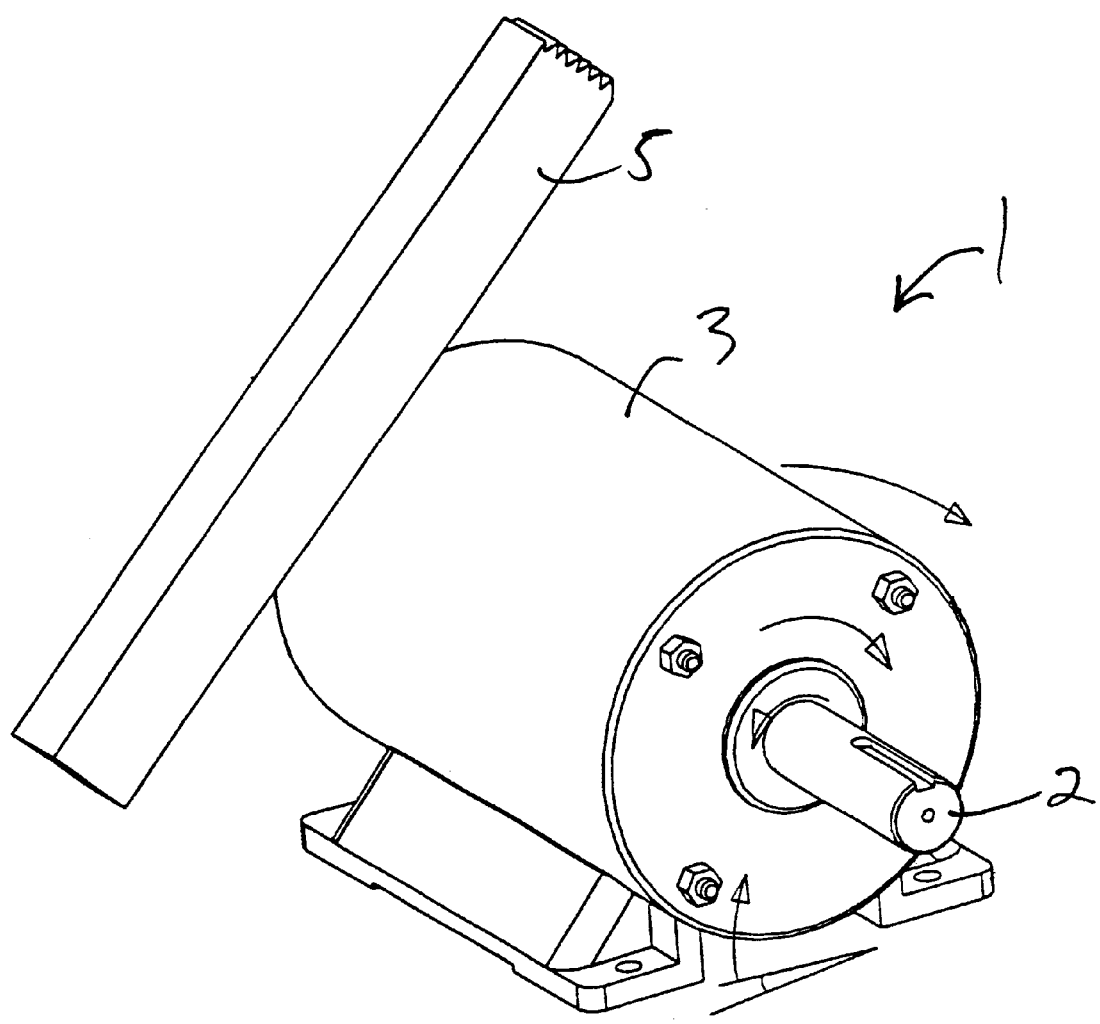
FIG. 1C illustrates a motor or machine having a brace positioned to counteract reaction exerted against the housing and brace applied properly and timely as in FIG. 1A above.
Figure 10:
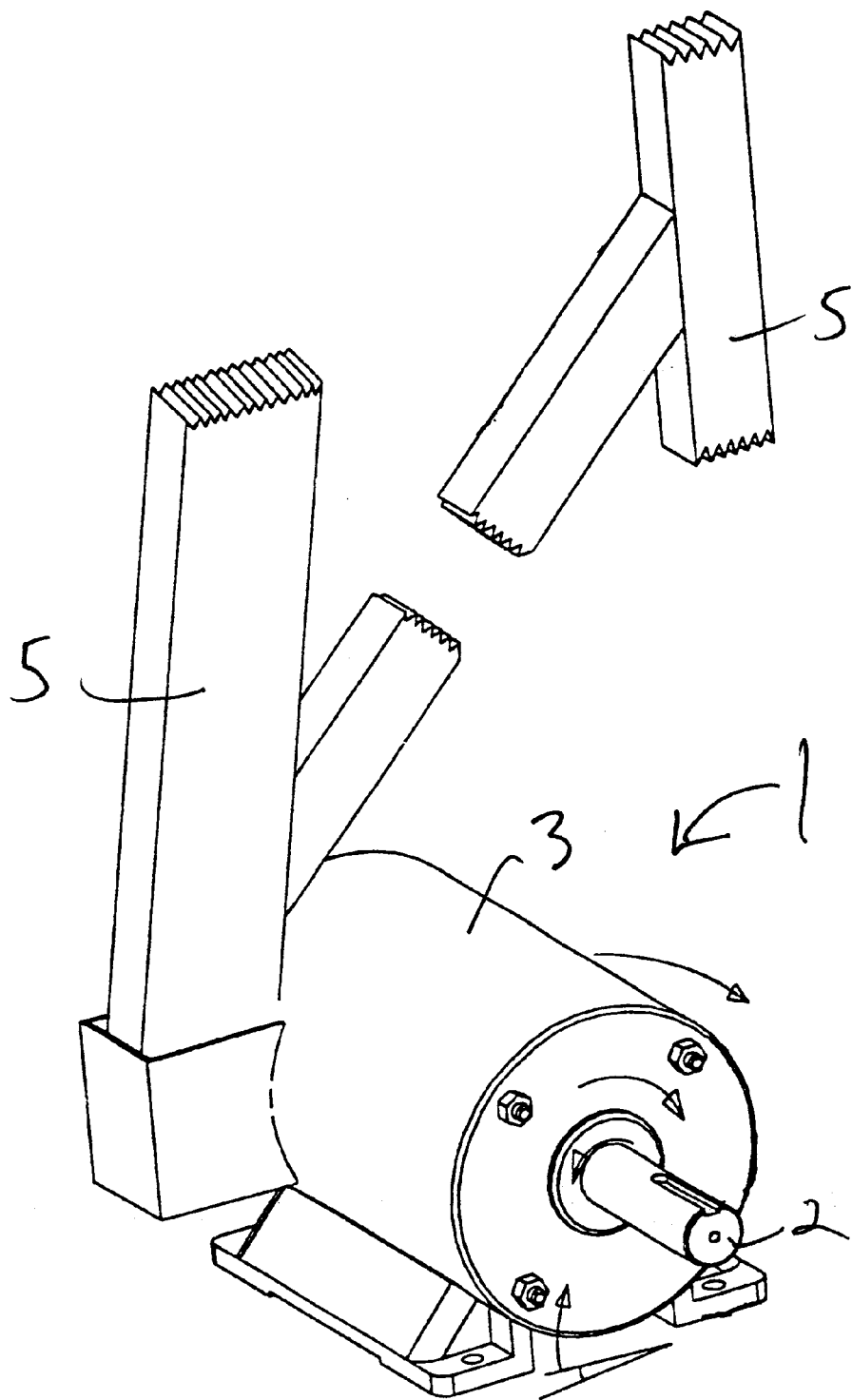
Figure 1E:
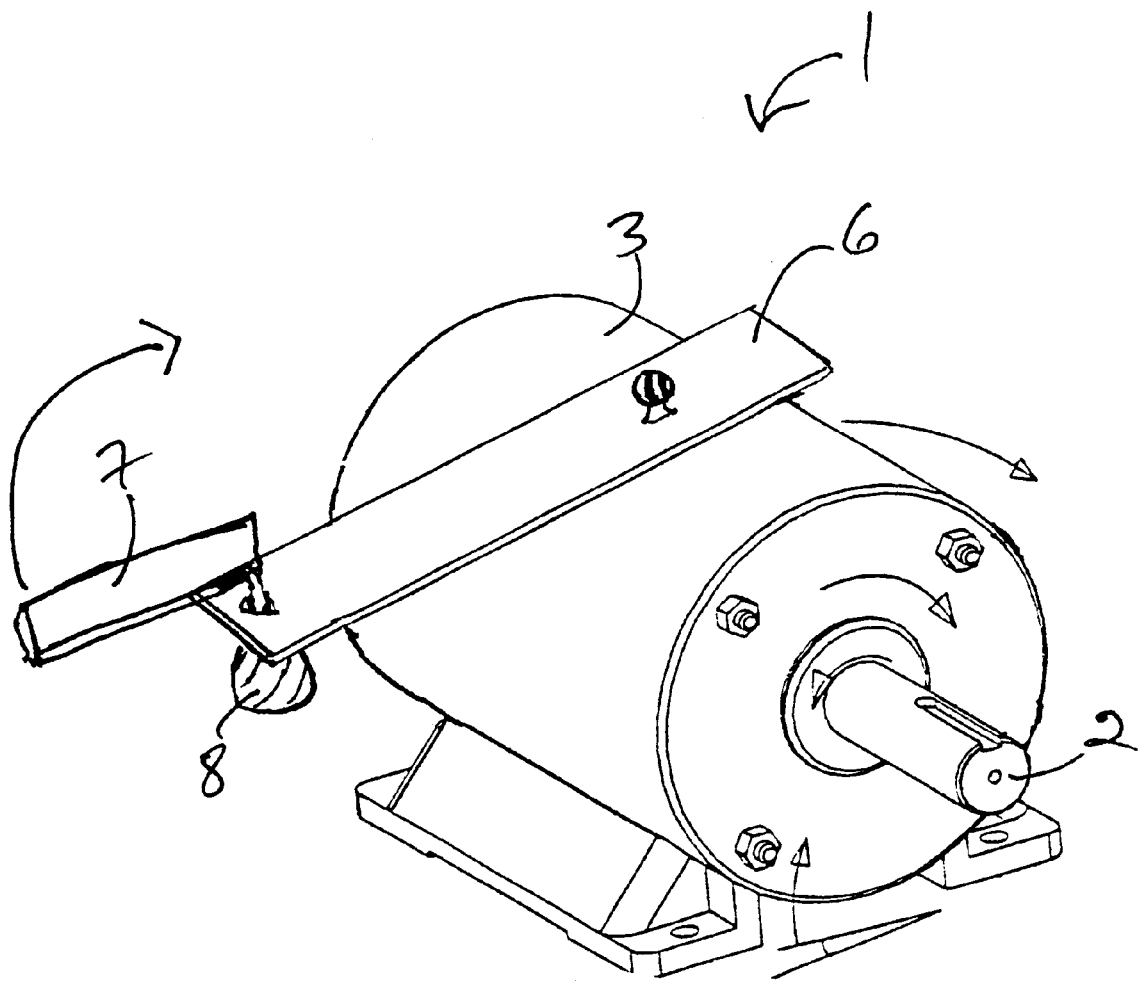
FIG. 1E illustrates a motor or machine having a counterweight with varying lever length to maintain activation after being reset properly and timely as in FIG. 1A above.

In mechanical systems, a considerable amount of energy is used in overcoming the inertia of the system during acceleration and deceleration. One type of mechanical system that is of particular interest are rotational systems 1 such as electrical motors, machines, or turbine engines. These systems will typically have rotational member 2 mounted in a housing 3. As rotational member 2 begins to turn, in accordance with Newton's third law of motion, reactive torque will be exerted on housing 3 in the direction opposite the rotation of rotational member 2. Similarly, when rotational member 2 is accelerated, a similar reactive torque will be exerted against housing 3. When rotational member 2 is decelerated or braked, a force will also be exerted against housing 3, but in.the opposite direction. All of the force exerted against housing 3 wastes energy and may damage housing 3 over time.

When force is exerted against housing 3, housing 3 will try to rotate in the direction that the force is applied. This will cause one side of housing 3 to rise assuming a horizontal shaft, although such displacement may in many cases be slight or infinitesimal from that standpoint but still wastes ¾ the energy The side of housing 3 which rises under these circumstances is referred to as the "light side" although it is realized that neither the weight nor mass actually change. Similarly, the opposite side of housing 3 is referred to as the "heavy side." Which side is the light side and which is the heavy side will vary depending on which way rotational member 2 is turning and whether rotational member 2 is accelerating or decelerating.

The effects of the reactive force exerted on housing 3 may be addressed by applying weight or tension in this special way to the light side of housing 3. This may be accomplished by placing a static counterweight 4 to housing 3 on the light side of the housing. The size of counterweight 4 will depend on the circumference of housing 3 or length of the lever arm and the force exerted by rotational member 2 i.e. the number of pound feet needed for gravity to block the reaction.

Similarly, a static brace 5 may be placed on the light side of housing 3. Brace 5 may connect housing 3 to surrounding structure or the earth, and counteract the torque exerted on housing 3.

Tension may also be exerted against housing 3. This might be accomplished by exerting downward tension directly against the light side of housing 3 with a spring 6 or other conventional means or by applying upward pressure to the heavy side of housing 3, again with a spring 6 or other conventional means. It may be useful to provide a cantilever for the exertion of upward force against the heavy side of housing 3, but it must be done properly.

Another method of neutralizing the force exerted by rotational member is by attaching a lever 6 to housing 3 Lever 6 should preferably be provided with a rotable weight 7 at the end of lever 6 opposite housing 3. Rotable weight 7 should preferably be positioned to rotate between a first position where rotable weight 7 is parallel to lever 6 and substantially vertically aligned with lever 7 and a second position where weight 7 is parallel to lever 6 but not substantially vertically aligned with lever 7 When weight 7 is in second position, the effective length of lever 6 will be the length of lever 6 plus the length of weight 7. Of course, the force exerted by lever 6 at the point where it attaches to housing 3 will vary depending upon how long lever 6 is, so the force can be varied by rotating weight 7 between its first position and second position. Similarly, weight 7 might be placed on a track and moved linearly between first position and second position. By varying the length of lever 6 and thus the force exerted by lever 6, the appropriate force can be tailored to match the amount of torque being exerted against housing 3 at any given time. Where the torque being exerted against housing 3 is constantly changing, it may be useful to continuously rotate rotable weight 7 from first position, through second position, and back to first position at a rate of about 1 rotation per second. A small motor 8 may be provided to effect the rotation of weight 7.

As noted above, the heavy side and the light side of housing 3 may change depending upon whether rotational member 2 is accelerating or decelerating, They may also change if the direction of rotation of rotational member 2 should change. Thus, it would be useful to have a system for counteracting reactive torque on either side of housing 3. This may be accomplished by allowing lever 6 to pivot on its attachment point to housing 3 so that lever 3 may rotate from one side of housing 3 to the other, and thus exert counter-torque to either side of housing 3

In any event, the counterweights and other measures must be activated to have any effect They must be applied "fresh" as acceleration begins and for the duration of acceleration. Or they can be activated by lifting or stretching spring and release while reaching from the opposite side. A camcorder was used to video the digital AC ammeter as motor comes up to speed in half the time (with countermeasures).

The principles of this invention may be applied to other devices that are not rotational in nature. For example, when a rocket is launched from a launch pad, the rocket will cause the pad to deflect downward. If the pad is reconfigured as a first class lever, with the rocket on one end and a fulcrum in the middle, the rocket will cause the end that it is on to deflect downward. This deflection may be counterbalanced on the opposite end by applying downward pressure there. Thus, by neutralizing the downward displacement caused by the rocket, the launch may be made more efficient. But to be effective, any counterweighting requires activation by applying countermeasures just as acceleration begins or else reset.

Air pads under light and heavy side can be used to equalize and relax the strain or unsteady state as accel begins and block the reaction.

Two or more weights can be on a cross-beam and small motor to rotate and keep lifting one and then the other and release while reaching from the other side. This should keep one of them always active so it can block reactions as they occur The counterweighting can be from motors or other components or even the systems own mass with a variable fulcrum or balance point.

Motors etc. one-fourth the size can have the same performance and our energy reserves last much longer. Prices can be adjusted and energy companies continue to thrive even longer. Less fuel needs to be on board so the range of planes and helicopters much greater. Roads and tires will last longer and pollution will be less. Bicycles will be easier to pedal and use the weight of the rider.

With a mat to stand on and a rope coming from counterweight or from a ground-anchor bite of earth thru pulleys, the activated counterforce can be applied at any angle, e.g. balls can be thrown further. These methods are good for easier to pedal bicycles and many other things.

A simple accellerometer can control a solenoid to lift the weight and release while reaching from a cantilever anchored on the other side and use weights of the motor or driver as counterweight.

It will be apparent that while preferred embodiments of the invention have been shown and described, various modifications and changes may be made without departing from the true spirit and scope of the invention, which is intended to be included within the scope of the following claims:

I claim:

1. A method of counteracting the reaction in a mechanical drive device consisting of a housing held on a platform and a driven rotational member contained within said housing, wherein said driven rotational member has an axis of rotation and wherein said driven rotational member applies force or reactive torque to said housing in a direction opposite the direction of rotation of said driven rotational member when said driven rotational member is accelerated from fixed stationary position by said mechanical drive device, the method comprises:

attaching a counterweight to said housing on a side opposite the reactive torque at the exact moment the driven rotational member is accelerated; or lift and release said housing platform on a side of said reactive torque at the exact moment said driven rotational member is accelerated.

2. A method of counteracting the reaction in a mechanical drive device consisting of a housing held on a platform and a driven rotational member contained within said housing, wherein said driven rotational member has an axis of rotation and wherein said driven rotational member applies force or reactive torque to said housing in a direction opposite the direction of rotation of said driven rotational member when said driven rotational member is accelerated from fixed stationary position by said mechanical drive device, the method comprises:

attaching a brace to said housing at the exact moment said driven rotational member is accelerated; whereby said housing will be precluded from rotating by said reactive torque.

3. A method of counteracting the reaction in a mechanical drive device consisting of a housing held on a platform and a driven rotational member contained within said housing, wherein said driven rotational member has an axis of rotation and wherein said driven rotational member applies force or reactive torque to said housing in a direction opposite the direction of rotation of said driven rotational member when said driven rotational member is accelerated from fixed stationary position by said mechanical drive device, the method comprises:

attaching to said housing a rigidly anchored spring or a cable on a side opposite the reactive torque at the exact moment the driven rotational member is accelerated.

4. A method of counteracting the reaction in a mechanical drive device consisting of a housing held on a platform and a driven rotational member contained within said housing, wherein said driven rotational member has an axis of rotation and wherein said driven rotational member applies force or reactive torque to said housing in a direction opposite the direction of rotation of said driven rotational member when said driven rotational member is accelerated from fixed stationary position by said mechanical drive device, the method comprises:

applying pressure to said housing in the opposite direction of said reactive torque at the exact moment the driven rotational member is accelerated.

5. A method of counteracting the reaction in a mechanical drive device consisting of a housing held on a platform and a driven rotational member contained within said housing, wherein said driven rotational member has an axis of rotation and wherein said driven rotational member applies force or reactive torque to said housing in a direction opposite the direction of rotation of said driven rotational member when said driven rotational member is accelerated from fixed stationary position by said mechanical drive device, the method comprises:

attaching a lever to said housing perpendicular to said axis of rotation on a side opposite the reactive torque at the exact moment the driven rotational member is accelerated wherein said lever is positioned to allow a force exerted at the end of the said lever to be applied to said housing.

6. A method of the reaction in a mechanical drive device according to claim 5 wherein said lever is provided with a weight at an end of said lever opposite said housing.

7. A method of counteracting the reaction in a mechanical drive device according to claim 6 wherein said weight is configured to be extended past the end of said lever, whereby the effective length of said lever may be increased.

8. A method of counteracting the reaction in a mechanical drive device according to claim 7 wherein said weight is configured to be extended past the end of said lever by pivotably mounting said weight at the end of said lever opposite said housing and rotating said weight.

9. A method of counteracting the reaction in a mechanical drive device according to claim 5 wherein said lever is configured to rotate to face opposite sides of said housing, whereby the direction of force applied to said housing by said lever may be changed depending upon the direction of the reactive torque generated by operation of the device.

* * * * *